(12) United States Patent
Bang et al.

(10) Patent No.: US 8,477,366 B2
(45) Date of Patent: Jul. 2, 2013

(54) APPARATUS, METHOD AND MEDIUM OUTPUTTING WIDE GAMUT SPACE IMAGE

(75) Inventors: Yousun Bang, Yongin-si (KR); Heui-keun Choh, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1056 days.

(21) Appl. No.: 11/882,273

(22) Filed: Jul. 31, 2007

(65) Prior Publication Data

US 2008/0043268 A1  Feb. 21, 2008

(30) Foreign Application Priority Data

Aug. 16, 2006  (KR) .................. 10-2006-0077308

(51) Int. Cl.
*H04N 1/60* (2006.01)
*G06F 15/00* (2006.01)

(52) U.S. Cl.
USPC ........... 358/1.9; 358/518; 358/3.23; 358/515; 358/520; 358/448; 382/162; 382/167; 345/590

(58) Field of Classification Search
USPC ............... 358/1.9, 518; 345/590; 382/167, 382/162
See application file for complete search history.

(56) References Cited

U.S. PATENT DOCUMENTS

| 6,373,595 | B1 * | 4/2002 | Semba et al. | 358/1.9 |
|---|---|---|---|---|
| 7,023,580 | B2 * | 4/2006 | Zhang et al. | 358/1.9 |
| 7,436,996 | B2 * | 10/2008 | Ben-Chorin et al. | 382/167 |
| 2005/0024652 | A1 * | 2/2005 | Gondek | 358/1.9 |
| 2007/0052719 | A1 * | 3/2007 | Tin | 345/590 |

FOREIGN PATENT DOCUMENTS

| JP | 11-205619 | 7/1999 |
|---|---|---|
| JP | 2001-43344 | 2/2001 |
| JP | 2002-359749 | 12/2002 |
| KR | 2003-0038058 | 5/2003 |
| KR | 10-2005-0023245 | 3/2005 |

OTHER PUBLICATIONS

Korean Office Action for corresponding Korean Patent Application No. 10-2006-0077308 dated Aug. 23, 2007 (pp. 1-3).
"Adobe Wide Gamut RGB color space", Wikipedia, Retrieved from Internet: URL:http://en.wikipedia.org/wiki/Adobe_Wide_Gamut_RGB_color_space on Jan. 15, 2007.
"List of color spaces and their uses", Wikipedia, Retrieved from Internet: URL:http://en.wikipedia.org/wiki/List_of_color_spaces_and_their_uses on Jan. 25, 2007.

* cited by examiner

*Primary Examiner* — David K Moore
*Assistant Examiner* — Quang N Vo
(74) *Attorney, Agent, or Firm* — Staas & Halsey LLP

(57) ABSTRACT

An apparatus, method and medium outputting a wide gamut space image in which one or more parameters that are needed to convert an existing color space into a wide gamut space are experimentally determined and then are applied to an image. The apparatus includes a feature extraction module to extract one or more feature differences between a standard gamut and a wide gamut of an image, a color range setting module to set a hue range according to the extracted feature differences and one or more experimentally determined parameters, and a conversion module to convert the image according to the extracted feature differences, the experimentally determined parameters, and the hue range.

27 Claims, 9 Drawing Sheets

|  | sRGB | | AdobeRGB | |
| --- | --- | --- | --- | --- |
|  | X | Y | X | Y |
| Red | 0.640 | 0.330 | 0.640 | 0.330 |
| Green | 0.300 | 0.600 | 0.210 | 0.710 |
| Blue | 0.150 | 0.060 | 0.150 | 0.060 |
| White | 0.313 | 0.329 | 0.313 | 0.329 |

| AdobeRGB | L* | C* | h* |
|---|---|---|---|
| RED | 66.39 | 122.62 | 38.47 |
| YELLOW | 98.27 | 115.28 | 104.95 |
| GREEN | 84.61 | 188.17 | 146.94 |
| CYAN | 87.53 | 93.05 | 192.40 |
| BLUE | 38.95 | 124.71 | 304.90 |
| MAGENTA | 73.63 | 116.81 | 337.47 |

| sRGB | L* | C* | h* |
|---|---|---|---|
| RED | 46.96 | 93.94 | 38.29 |
| YELLOW | 98.37 | 93.40 | 106.62 |
| GREEN | 91.58 | 110.01 | 131.88 |
| CYAN | 93.88 | 36.75 | 195.52 |
| BLUE | 37.14 | 121.28 | 305.06 |
| MAGENTA | 57.55 | 111.80 | 324.45 |

| CHROMA | HUE ANGLE | | | | | | | |
|---|---|---|---|---|---|---|---|---|
| | 250 | 260 | 270 | 280 | 290 | 300 | 310 | 320 |
| 0 | 0.00 | 0.00 | 0.00 | 0.00 | 0.00 | 0.00 | 0.00 | 0.00 |
| 10 | 0.00 | 0.00 | 0.00 | 0.00 | 0.00 | 0.00 | 0.00 | 0.00 |
| 20 | 0.00 | 0.00 | 0.00 | 0.00 | 0.00 | 0.00 | 0.00 | 0.00 |
| 30 | 0.00 | 0.94 | 2.80 | 2.80 | 2.80 | 2.80 | 0.94 | 0.00 |
| 40 | 0.00 | 1.04 | 2.84 | 6.21 | 6.21 | 2.84 | 1.04 | 0.00 |
| 50 | 0.00 | 4.47 | 6.20 | 9.92 | 9.92 | 6.20 | 4.47 | 0.00 |
| 60 | 0.00 | 6.60 | 9.04 | 13.47 | 13.47 | 9.04 | 6.60 | 0.00 |
| 70 | 0.00 | 8.34 | 11.34 | 14.34 | 14.34 | 11.34 | 8.34 | 0.00 |
| 80 | 0.00 | 9.43 | 12.62 | 15.81 | 15.81 | 12.62 | 9.43 | 0.00 |
| 90 | 0.00 | 10.47 | 13.83 | 17.20 | 17.20 | 13.83 | 10.47 | 0.00 |
| 100 | 0.00 | 11.46 | 14.99 | 18.52 | 18.52 | 14.99 | 11.46 | 0.00 |
| 110 | 0.00 | 12.40 | 16.08 | 19.77 | 19.77 | 16.08 | 12.40 | 0.00 |
| 120 | 0.00 | 13.24 | 17.02 | 20.81 | 20.81 | 17.02 | 13.24 | 0.00 |
| 130 | 0.00 | 13.99 | 17.75 | 21.52 | 21.52 | 17.75 | 13.99 | 0.00 |
| 140 | 0.00 | 14.74 | 18.49 | 22.24 | 22.24 | 18.49 | 14.74 | 0.00 |
| 150 | 0.00 | 15.49 | 19.23 | 22.96 | 22.96 | 19.23 | 15.49 | 0.00 |

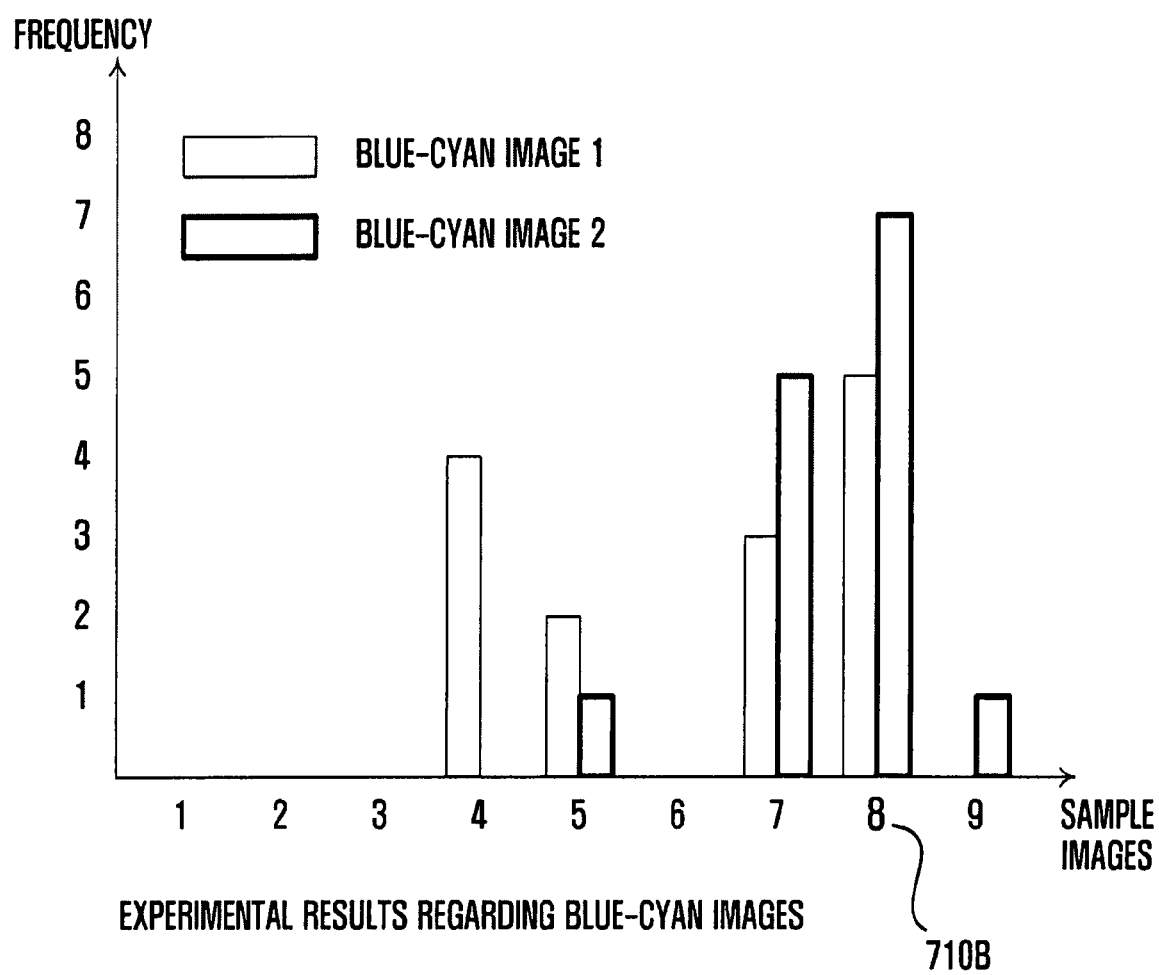

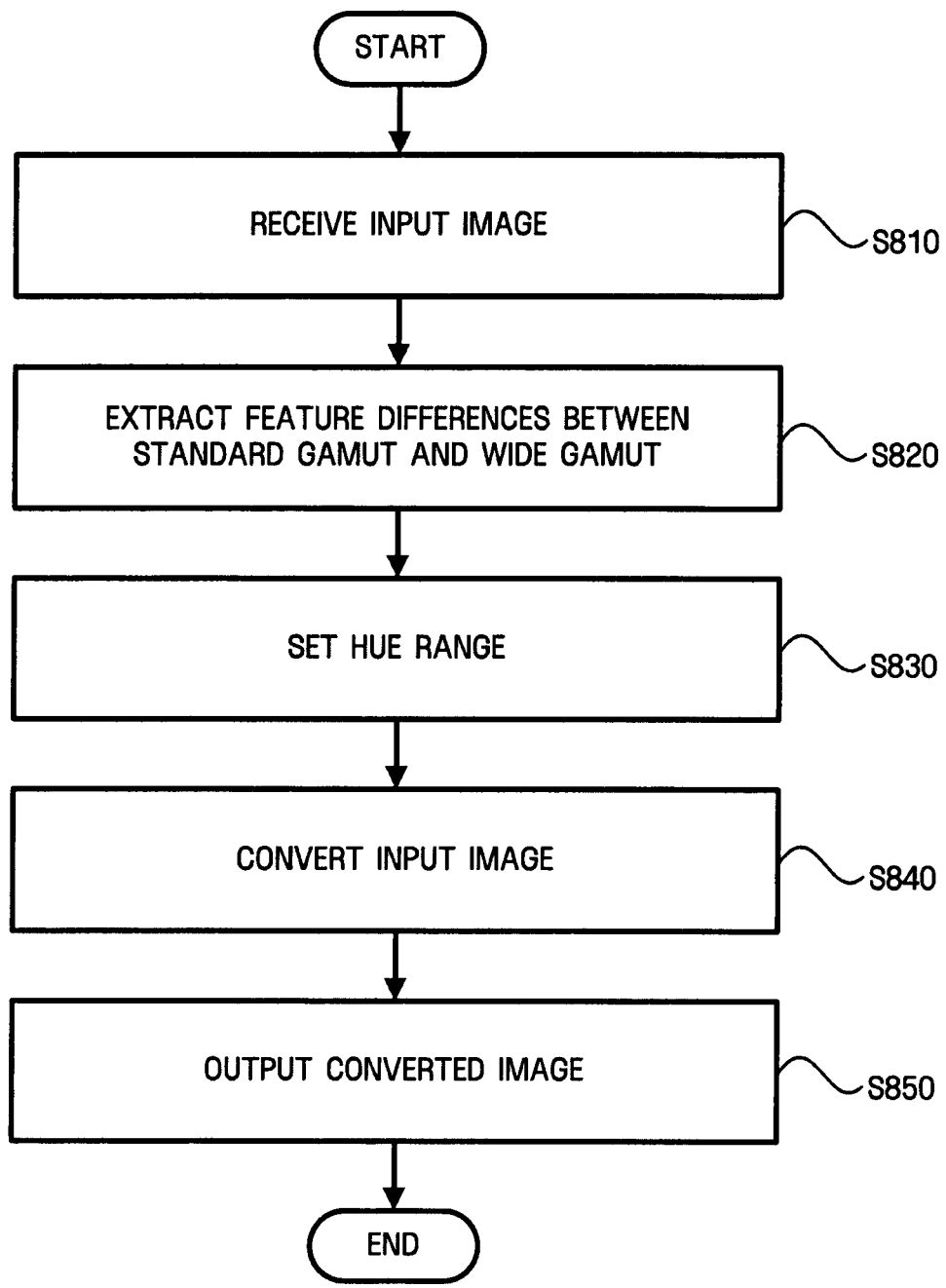

APPARATUS, METHOD AND MEDIUM OUTPUTTING WIDE GAMUT SPACE IMAGE

CROSS-REFERENCE TO RELATED APPLICATIONS

This application claims priority from Korean Patent Application No. 10-2006-0077308 filed on Aug. 16, 2006 in the Korean Intellectual Property Office, the disclosure of which is incorporated herein by reference in its entirety.

BACKGROUND

1. Field

One or more embodiments of the present invention relate to an apparatus, method and medium outputting a wide gamut space image, and more particularly, to an apparatus, method and medium outputting a wide gamut space image in which one or more parameters that are needed to convert an existing color space into a wide gamut space are experimentally determined and then are applied to an input image.

2. Description of the Related Art

In order to meet various user demands, the functions of digital image devices such as monitors, scanners, or printers have diversified and have been improved. Digital image devices may adopt different color spaces or color models according to their intended use. Color models are classified into device-dependent color models and device-independent color models. Examples of the device-dependent color models include red-green-blue (RGB) models and cyan-magenta-yellow-black (CMYK) color models, which are a type of subtraction color space models. Examples of the device-independent color models include CIE color models such as a CIE LAB model, a CIE XYZ model, and a CIE LUV model.

The CIE L*a*b* model quantifies colors defined by the Commission Internationale de l'Eclairage using color space coordinates, and represents the results of the quantification as L* (lightness), a* (red-greenness), and b* (yellow-blueness). The CIE XYZ model represents a set of RGB tristimulus values as another set of tristimulus values that are all positive, i.e., X, Y, and Z values. The CMYK color space is commonly used in the field of printing, and the RGB color space is commonly used in various industrial fields that involve the use of computer monitors, such as the field of web graphics.

Digital imaging devices may output colors in an input image as they are, or may convert one of the colors in the input image and output an image obtained by the conversion, thereby enabling users to enjoy images with more natural colors.

In the meantime, a wide gamut space can be used to convert colors in an image into more natural ones. A wide gamut space is a color space having a wider range of colors than a standard RGB (sRGB) color space (IEC 61966-2.1) and enables the representation of images with more natural colors. In the past, wide gamut space images were typically only demanded by professionals in certain fields. Nowadays, with an increasing demand for image output devices such as cameras, monitors, and scanners that support a variety of wide gamut spaces, wide gamut spaces have attracted more public attention.

Digital images created by imaging devices such as cameras that support wide gamut spaces include a wider range of colors than digital images created by imaging devices that support the sRGB color space, and are thus clearer than digital images created by imaging devices that support the sRGB color space. However, conventional digital imaging devices process a digital image including wide gamut space information in the same manner as an sRGB image. Thus, an output image obtained by handling a wide gamut space image may not be able to properly display a wide gamut of colors.

Korean Patent Laid-Open Gazette No. 2003-038058 discloses an apparatus for extending the gamut of color devices which receives RGB color coordinates from a narrow gamut device, converts the received RGB color coordinates into lightness, chroma, and hue coordinates, extends color attributes such as lightness and chroma using a linear extension formula, preserves color attribute information obtained by the extension such that the color attribute information can be prevented from being outside the gamut of a wide gamut device, and outputs the result of the preservation. This apparatus, however, performs color conversion on input colors simply by creating a lookup table regarding lightness, chroma, and hue and linearly extending the lookup table. Thus, this apparatus may not be able to properly perform color conversion and provide colors that are suitable for the human eye.

Therefore, it is necessary to develop color correction techniques capable of extracting one or more feature differences between a wide gamut space and an existing gamut space and realizing colors for an output image that are almost indistinguishable from those actually perceived by users based on the feature differences.

SUMMARY

One or more embodiments of the present invention provide an apparatus, method and medium outputting a wide gamut space image in which one or more parameters that are needed to convert an existing color space into a wide gamut space are experimentally determined and then are applied to an input image.

Additional aspects and/or advantages of the invention will be set forth in part in the description which follows and, in part, will be apparent from the description, or may be learned by practice of the invention.

To achieve at least the above and/or other aspects and advantage, embodiments of the present invention include an apparatus outputting a wide gamut image. The apparatus includes a feature extraction module to extract one or more feature differences between a standard gamut and a wide gamut of an image, a color range setting module to set a hue range according to the extracted feature differences and one or more experimentally determined parameters, and a conversion module to convert the image according to the extracted feature differences, the experimentally determined parameters, and the hue range.

To achieve at least the above and/or other aspects and advantage, embodiments of the present invention include a method outputting a wide gamut image. The method includes extracting one or more feature differences between a standard gamut and a wide gamut of an image, setting a hue range according to the extracted feature differences and one or more experimentally determined parameters, and converting the image according to the extracted feature differences, the experimentally determined parameters, and the hue range.

To achieve at least the above and/or other aspects and advantage, embodiments of the present invention include a method outputting a wide gamut image. The method includes setting a hue range based on one or more extracted feature differences between a standard gamut and a wide gamut of an image and one or more experimentally determined parameters, and converting the image based on the extracted feature differences, experimentally determined parameters and the set hue range.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 illustrates a two-dimensional (2D) lookup table which is needed to perform nonlinear color conversion, according to an embodiment of the present invention;

FIGS. 7A and 7B illustrates the results of the experiments illustrated in FIG. 6, according to an embodiment of the present invention; and FIG. 8 is a flowchart illustrating a method of outputting a wide gamut space image, according to an embodiment of the present invention.

DETAILED DESCRIPTION OF EMBODIMENTS

Figure 1:
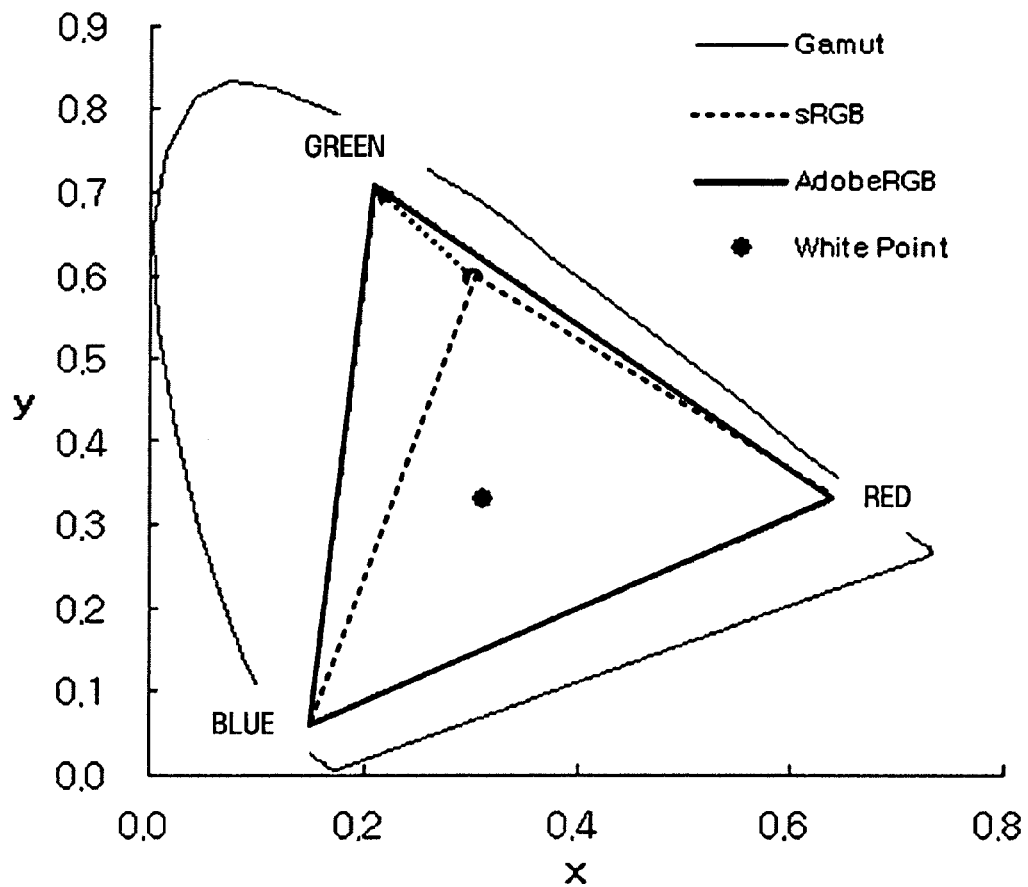
FIG. 1 illustrates the relationship between a standard RGB (sRGB) gamut and a wide gamut in a CIE XY color space.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates a relationship between a standard Red Green Blue (sRGB) gamut and a wide gamut in a CIE XY color space. Referring to FIG. 1, the sRGB gamut is more discrepant than the wide gamut in a green color range than in other primary color ranges such as the red and blue color ranges. The wide gamut illustrated in FIG. 1 is, as an example, an Adobe wide gamut. Wide gamuts other than the Adobe wide gamut may also be discrepant from the sRGB gamut.

Figure 2:
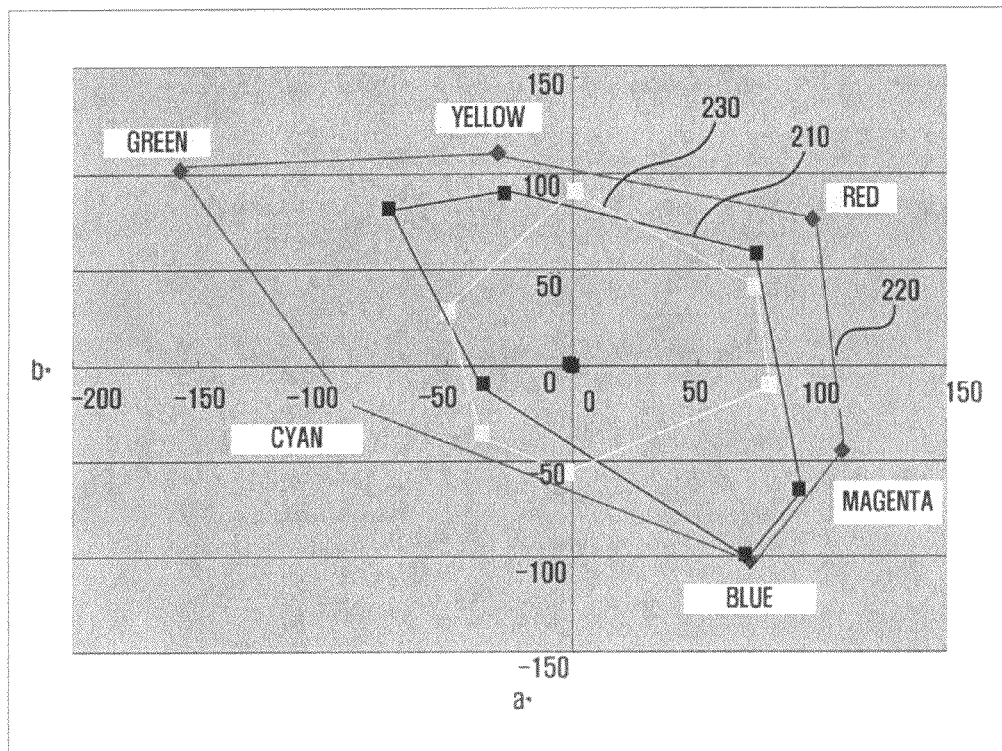
FIG. 2 illustrates the relationship between a standard RGB (sRGB) gamut and a wide gamut in a CIE XY color space.

FIG. 2 explains an sRGB gamut 210 and a wide gamut 220 in a CIE L*a*b* color space. Referring to FIG. 2, a gamut 230 may be a printer gamut that is supported by a predetermined printer. The CIE L*a*b* color space is a colorimetric method that involves quantifying colors defined by the Commission Internationale de l'Eclairage using color space coordinates and representing the results of the quantification as L* (lightness), a* (red-greenness), and b* (yellow-blueness). Referring to FIG. 2, the horizontal axis may represent a red-green scale, and the vertical axis may represent a yellow-blue scale, for example.

Referring to FIG. 2, the wide gamut 220 may include the sRGB gamut 210, for example. The printer gamut 230 may be completely included in the wide gamut 220. The printer gamut 230 may be partly excluded from the sRGB gamut 210. The predetermined printer may map a gamut of its own, e.g., the printer gamut 230, to the sRGB gamut 210 through, for example, cusp mapping, clipping, or extension, and may output images according to the results of the mapping.

If an input image is a wide gamut space image, the predetermined printer may not be able to properly represent some colors in the input image when outputting the input image through the aforementioned mapping operation because of the difference between the sRGB gamut 210 and the wide gamut 220. Therefore, according to one or more embodiments of the present invention, the mapping relationship between a plurality of gamuts (e.g., between the sRGB gamut 210 and the wide gamut 220) for primary colors that result in large discrepancies between the gamuts (e.g., between the sRGB gamut 210 and the wide gamut 220) are defined as parameters, and the parameters may be applied to hue and saturation, thereby enabling the output of images that can reflect information regarding a wide gamut space.

The term "wide gamut" used in this disclosure typically refers to an Adobe wide gamut. However, the present invention is not restricted thereto, and one or more embodiments of the present invention may be applied to wide gamuts other than an Adobe wide gamut. The types of primary colors to which a set of parameters are applied and the values of the parameters may vary according to the type of wide gamut used.

Figure 3:
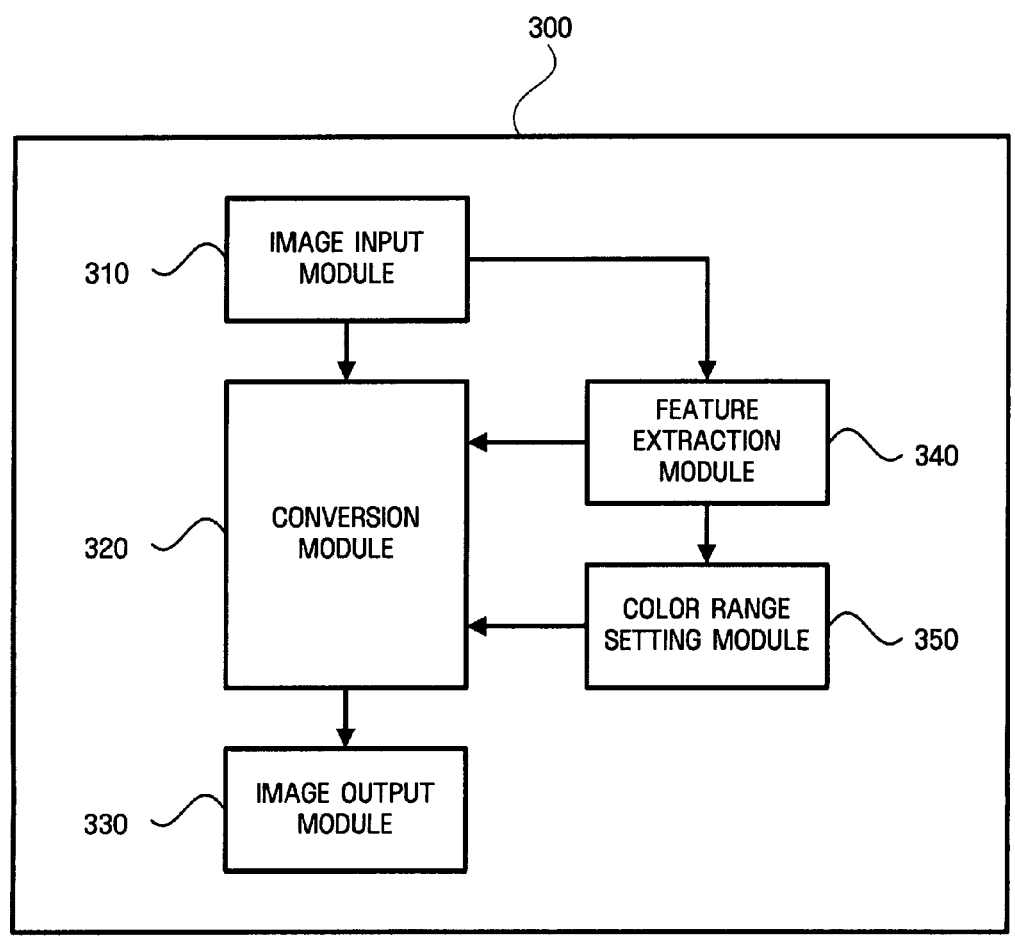
FIG. 3 illustrates an apparatus outputting a wide gamut space image, according to an embodiment of the present invention.

FIG. 3 illustrates an apparatus 300 (hereinafter referred to as the image output apparatus 300) for outputting a wide gamut space image, according to an embodiment of the present invention. Referring to FIG. 3, the image output apparatus 300 may include an image input module 310, a feature extraction module 340, a color range setting module 350, a conversion module 320, and an image output module 330, for example.

The image input module 310 may receive a wide gamut space image as an input image, for example. The input image may be an analog image or a digital image, for example. The image input module 310 may also convert an analog image into a digital image.

If a color model of the input image is an RGB color model, which is a type of additive color space model, the image input module 310 may convert the color model of the input image into a CIE LAB color model, which is a uniform color space model, and into a CIE LCH color model, which represents color properties. Accordingly, the feature extraction module 340 may receive an image of an LCH color model from the image input module 310.

Here, the LCH color model may be a color model which represents colors with three components, i.e., lightness (L*), chroma (C*), and hue (h).

The feature extraction module 340 may extract one or more feature differences between an sRGB gamut and a wide gamut. The sRGB gamut and the wide gamut may be discrepant from each other, as illustrated in FIGS. 1 and 2. The feature extraction module 340 may extract one or more primary colors, which result in larger discrepancies between the sRGB gamut and the wide gamut than a predefined threshold, from a plurality of primary colors included in both the sRGB gamut and the wide gamut.

In other words, if the relationship between the sRGB gamut and the wide gamut is as illustrated in FIG. 2, the feature extraction module 340 may determine, for example, that magenta and yellow do not result in large discrepancies between the sRGB gamut and the wide gamut, and may determine that red, green, cyan, and blue do result in large discrepancies between the sRGB gamut and the wide gamut.

Also, the feature extraction module 340 may determine that green and cyan chromas in the wide gamut are higher than their respective counterparts in the sRGB gamut.

The color range setting module 350 may set a hue range according to the extracted feature differences provided by the feature extraction module 340, and one or more experimentally determined parameters, for example. In other words, once the feature extraction module 340 extracts a primary color that needs to be converted, a range of hues that can be rendered may be determined according to the experimentally determined parameters. The color range setting module 350 may set a hue range according to the extracted primary color and the experimentally determined parameters.

The color range setting module 350 may set not only a minimum hue value and a maximum hue value regarding a primary color that needs to be converted, but also an intermediate hue value regarding the primary color, and the intervals between the maximum value and the intermediate value, and between the intermediate value and the minimum value. For example, if the primary color that needs to be converted is green, then the color range setting module 350 may set a hue range by respectively setting the minimum hue value, the intermediate hue value, and the maximum hue value, corresponding to the primary color, to hue angles of 151, 157, and 165°, for example. Alternatively, the color range setting module 350 may set a hue range based on a set of values input by a user.

The conversion module 320 may convert the input image according to the extracted feature differences provided by the feature extraction module 340, the experimentally determined parameters, and the hue range set by the color range setting module 350, for example. In other words, the conversion module 320 may perform mapping between the sRGB gamut and the wide gamut in order to properly represent the input image. The structure and operation of the conversion module 320 will be described in greater later detail with reference to FIG. 4.

The image output module 330 may output a converted image provided by the conversion module 320, for example. According to an embodiment, the image output apparatus 300 may be a printer. In this case, the image output module 330 may convert image data provided by the conversion module 320 to a Cyan Magenta Yellow blacK (CMYK) color space, and print the result of the conversion. For this, the image output module 330 may map a gamut, e.g., a printer gamut, which is supported by the image output module 330 to the sRGB gamut for the converted image through, by way of example, cusp mapping, clipping, or extension, and output the converted image according to the results of the mapping.

Figure 4:
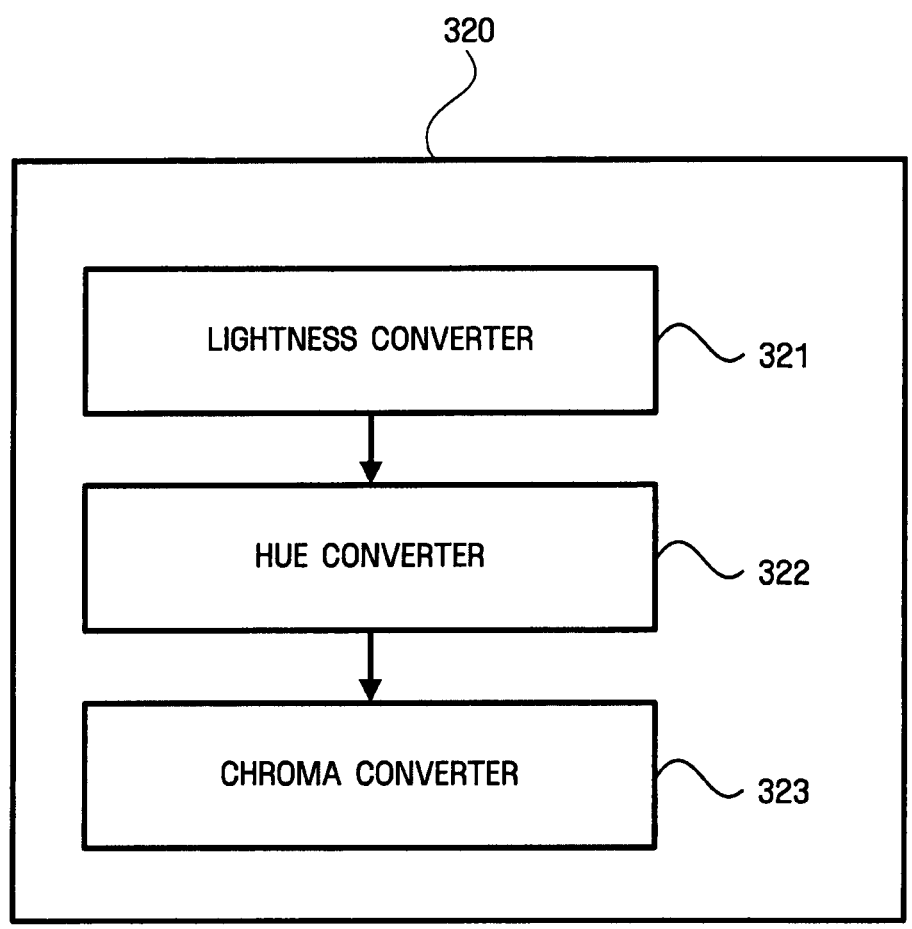
FIG. 4 illustrates a conversion module illustrated in FIG. 3.

FIG. 4 illustrates the conversion module 320, such as illustrated in FIG. 3. Referring to FIG. 4, the conversion module 320 may include a lightness converter 321, a hue converter 322, and a chroma converter 323, for example.

The lightness converter 321 may convert the lightness of the input image in order to enhance the operating efficiencies of the hue converter 322 and the chroma converter 323. The lightness converter 321 may use, for example, a sigmoidal function for lightness conversion. An average and a standard deviation of the sigmoidal function may be input by a user.

The hue converter 322 may perform linear hue conversion on hues in an image obtained by the conversion performed by the lightness converter 321 so that the corresponding hues may fall within the hue range set by the color range setting module 350. The hue converter 322 may perform hue conversion on a predetermined range of hues using a plurality of weights, e.g., in a two-dimensional (2D) lookup table. For example, the distribution values of blue hues that have a hue angle of 250-320°, unlike other hue values, are bent. Thus, if linear hue conversion is performed on blue hues, the values of the blue hues may be distorted so that the blue hues are represented as purple hues. Therefore, nonlinear hue conversion, which involves the application of a plurality of weights in a 2D lookup table, instead of linear hue conversion, may be performed on a hue range of about 250-320° as an example.

FIG. 5 illustrates a 2D lookup table 500 that may be necessary for nonlinear hue conversion. The hue converter 322 may perform hue conversion on hues that are within the hue range of 250-320°, using, e.g., the 2D lookup table 500.

In order to perform hue conversion, the hue converter 322 may use Equations 1 and 2.

$$hue_{Temp} = \frac{(hue_{IN} - wRGB\_hue_L) \times output\_hue_H - (hue_{IN} - wRGB\_hue_H) \times output\_hue_L}{wRGB\_hue_H - wRGB\_hue_L}$$ Equation 1

$$hue_{OUT} = hue_{IN} + (hue_{Temp} - hue_{IN}) \times \frac{w_{c,\beta}}{w_{maxc,\beta}}$$ Equation 2 where $hue_{IN}$ may indicate the hue angle of the input image when the input image is analyzed using a CIE L*a*b* color space, $hue_{Temp}$ may indicate a hue angle obtained by linear hue conversion, $hue_{OUT}$ may indicate a hue angle obtained by applying a weight in a 2D lookup table, $wRGB\_hue_L$ may indicate a lower boundary of a wide gamut including the hue angle $hue_{IN}$, $output\_hue_L$ may indicate a lower boundary of a gamut that includes the hue angle $hue_{IN}$ and is supported by the image output module 330, $output\_hue_H$ may indicate an upper boundary of the gamut that includes the hue angle $hue_{IN}$ and is supported by the image output module 330, $w_{o,\theta}$ may indicate a first weight corresponding to a chroma c and a hue angle θ, and $w_{max\ o,\theta}$ may indicate a second weight corresponding to a maximum chroma max c and the hue angle θ.

Chroma discrepancies between an sRGB gamut and a wide gamut may be more apparent in green and cyan areas than in other primary color areas, as illustrated in FIG. 2. Given all this, the conversion module 320 may perform chroma conversion as well as lightness and hue conversion. For this, the chroma converter 323 may convert a predetermined color that results in a larger chroma discrepancy, between an sRGB gamut and a wide gamut, than a predefined threshold by applying one or more experimentally determined parameters to the predetermined chroma. In this case, the chroma converter 323 may determine the degree of chroma conversion based on the hue angles of colors in green and cyan areas.

In the meantime, experimental results show that chroma discrepancies between an sRGB gamut and a wide gamut may be less apparent in a yellow area. Thus, chroma conversion need not be performed in the yellow area. Also, since chroma conversion in, e.g., red-magenta areas may adversely affect the representation of skin tones in an image and thus result in image distortion, chroma conversion may be performed in the red and magenta areas to a limited extent.

Figure 6:
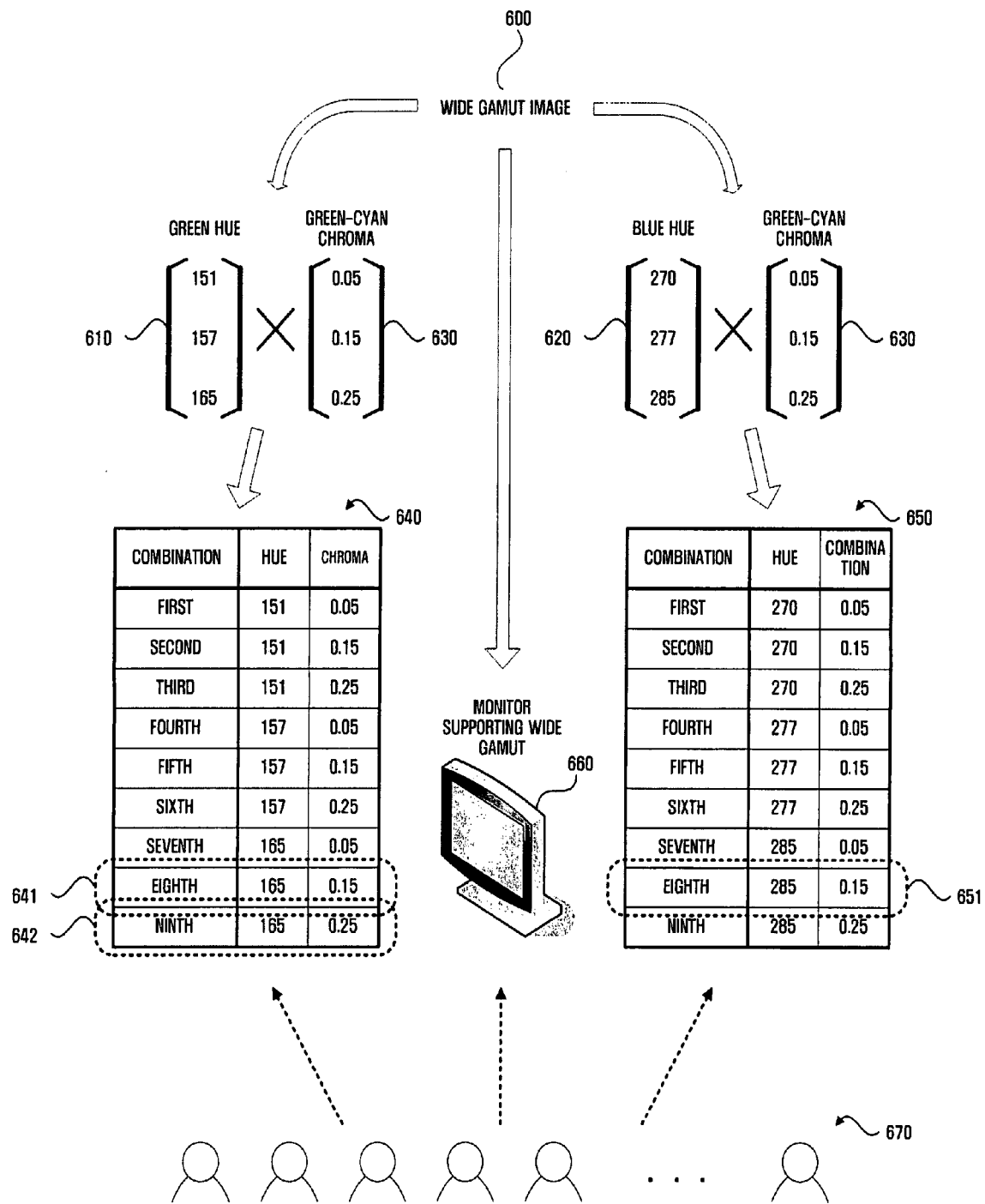
FIG. 6 illustrates the determination of parameters through experiments, according to an embodiment of the present invention.

FIG. 6 explains the determination of parameters through experiments, according to an embodiment of the present invention.

According to an embodiment of the present invention, hue angle variations that may be needed to map primary colors that result in larger hue discrepancies (between an sRGB gamut and a wide gamut) than a predefined threshold to the wide gamut, and chroma variations that are needed to map primary colors that result in larger chroma discrepancies (between the sRGB gamut and the wide gamut) than a predefined threshold to the wide gamut, may be used as parameters.

For example, when hue discrepancies between the sRGB gamut and the wide gamut are apparent in green and cyan areas, green hue angle variations and cyan hue angle variations may be used as parameters. FIG. 2 compares an Adobe wide gamut with an sRGB gamut, as an example. Hue discrepancies between a typical wide gamut and the sRGB gamut may be apparent in green and blue-cyan. Thus, according to an embodiment, green and blue-cyan hues may be chosen to be experimented.

Also, chroma discrepancies between a typical wide gamut and the sRGB gamut may be more apparent in a green-cyan area. Thus, according to an embodiment, green-cyan chromas may be chosen to be experimented.

Therefore, an experiment may be conducted using a plurality of green hue angles, a plurality of blue-cyan hue angles, and a plurality of green-cyan chromas as parameters, for example.

Referring to an experiment illustrated in FIG. 6, three green hue angles 610 (e.g., hue angles of 151, 157, and 165°), three blue-cyan hues angles 620 (e.g., hue angles of 270, 277, and 285), and three green-cyan chromas 630 (e.g., chromas of 0.05, 0.15, and 0.25) may be used.

The experiment may be conducted by inputting a wide gamut image 600, generated by a wide gamut imaging device (e.g., a digital camera), to a monitor 660 that supports a wide gamut and enabling the monitor 660 to output the wide gamut image 600. The wide gamut image output by the monitor 660 may be viewed by one or more viewers 670.

Since the number of green hue angles 610 and the number of green-cyan chromas 630 are both, e.g., 3, a total of nine green hue angle-green-cyan chroma combinations 640 may be obtained using the green hue angles 610 and the green-cyan chromas 630. Likewise, a total of nine blue-cyan hue angle-green-cyan chroma combinations 650 may be obtained using the blue-cyan hue angles 620 and the green-cyan chromas 630.

In other words, nine green hue angle-green-cyan chroma combinations 640 are provided for green, and nine blue-cyan hue angle-green-cyan chroma combinations 650 are provided for blue-cyan. The green hue angle-green-cyan chroma combinations 640 and the blue-cyan hue angle-green-cyan chroma combinations 650 may be applied to the wide gamut image 600, and then, the results of the application may be printed.

Accordingly, nine printed images (hereinafter referred to as green images) regarding green, and nine printed images (hereinafter referred to as blue-cyan images) regarding blue-cyan may be obtained. Then, the viewers 670 may choose one or more green images that are similar to the wide gamut image output by the monitor 660 and one or more blue-cyan images that are similar to the wide gamut image output by the monitor 660. Then, a green hue angle-green-cyan chroma combination 640 corresponding to each of the printed green images chosen by the viewers 670 and a blue-cyan hue angle-green-cyan chroma combination 650 corresponding to each of the printed blue-cyan images chosen by the viewers 670 may be determined to be applied to a parameter setting.

Figure 7A:
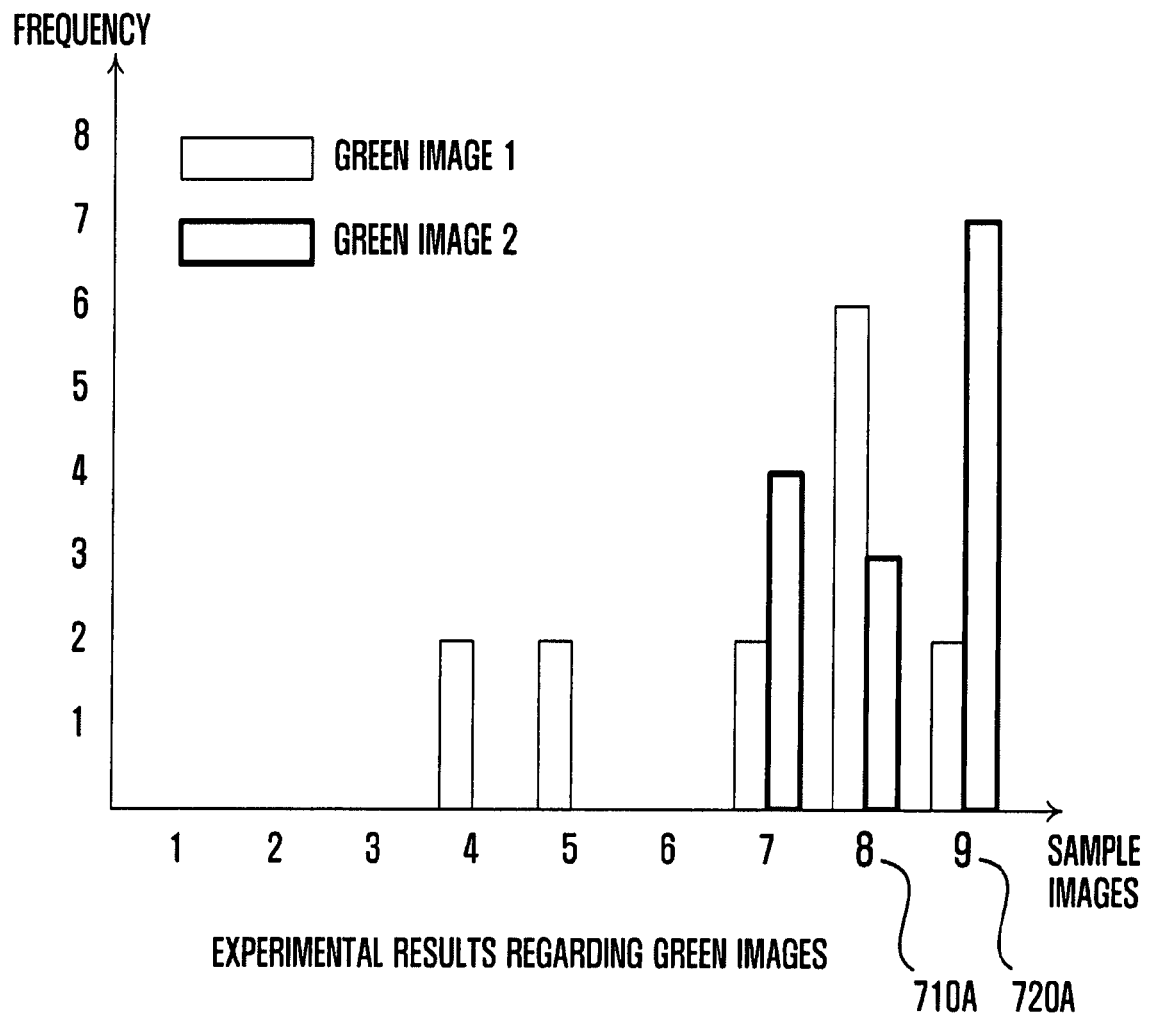

FIGS. 7A and 7B illustrate experimental results obtained by the experiment illustrated in FIG. 6. Specifically, FIG. 7A presents experimental results regarding green images, and FIG. 7B presents experimental results regarding blue-cyan images.

The experimental results of FIG. 7A indicate that most viewers have chosen an eighth version (710A) of green image 1 and a ninth version (720A) of green image 2. Accordingly, an eighth green hue angle-green-cyan chroma combination 641 corresponding to the eighth version 710A and a ninth green hue angle-green-cyan chroma combination 642 corresponding to the ninth version 710B are applied to parameter setting.

The experimental results of FIG. 7B indicate that most viewers have chosen eighth versions 710B of blue-cyan image 1 and blue-cyan image 2. Accordingly, an eighth blue-cyan hue angle-green-cyan chroma combination 651 corresponding to the eighth versions 710B of blue-cyan image 1 and blue-cyan image 2 is applied to parameter setting.

In other words, the eighth version of green image 1 is an image obtained by applying a hue angle of 165° and a chroma of 0.15, and the ninth version of green image 1 is an image obtained by applying a hue angle of 165° and a chroma of 0.25. Therefore, a hue angle of 165° may be determined as hue angle for green, and a chroma of 0.2

$$\left(\frac{0.15 + 0.25}{2}\right)$$

may be determined as chroma for green.

Likewise, since the eighth versions of blue-cyan images 1 and 2 are images obtained by applying a hue angle of 285° and a chroma of 0.15, the hue angle of 285° may be determined as hue angle for blue-cyan, and the chroma of 0.15 may be determined as chroma for blue-cyan.

Experiments may be conducted using hue angles other than those set forth herein, and using chromas other than those set forth herein. Accordingly, different parameters other than those set forth herein may be experimentally determined and may be applied to the apparatus 300.

FIG. 8 is a flowchart illustrating a method of outputting a wide gamut image, according to an embodiment of the present invention. Referring to FIG. 8, in operation S810, an input wide gamut image may be received, e.g., by the image input module 310 of the apparatus 300.

In operation S820, the input wide gamut image may be transmitted, e.g., to the feature extraction module 340, and one or more feature differences may be extracted between an sRGB gamut and a wide gamut, e.g. by the feature extraction module 340. In detail, one or more primary colors may be extracted that result in larger discrepancies, between the sRGB gamut and the wide gamut, than a predefined threshold e.g., by the feature extraction module 340.

In operation S830, the extracted feature differences may be transmitted, e.g., by the feature extraction module 340 to the color range setting module 350, and a hue range may be set according to the extracted feature differences and one or more experimentally determined parameters, e.g., by the color range setting module 350. In detail, the hue range may be set based on a set of default values or according to a set of values input by a user, e.g., by the color range setting module 350.

In operation S840, the input wide gamut image may be converted according to the extracted feature differences, experimentally determined parameters, and the hue range, e.g., by the conversion module 320. In an embodiment, the conversion module 320 may include the lightness converter 321, the hue converter 322, and the chroma converter 323, for example. The lightness converter 321, the hue converter 322, and the chroma converter 323 have already been described in greater detail, and thus further descriptions thereof will be omitted.

In operation S850, the converted image may be transmitted, e.g., by the conversion module 320 to the image output module 330, and the transmitted converted image may be output by the image output module 330. In detail, the converted image transmitted by the conversion module 320 may be converted into a CMYK image, and may also be printed as a CMYK image, e.g., by the image output module 330.

One or more embodiments of the present invention have been described herein with reference to flowchart illustrations of user interfaces, methods, and computer program products according to one or more embodiments of the invention. It will be understood that each block of the flowchart illustrations, and combinations of blocks in the flowchart illustrations, may be implemented by computer program instructions.

These computer program instructions may be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus implement the functions specified in the flowchart block or blocks.

Each block of the flowchart illustrations may also represent a module, segment, or portion of code, which comprises one or more executable instructions for implementing the specified logical function(s). It should be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In addition to this discussion, one or more embodiments of the present invention may also be implemented through such software as computer readable code/instructions in/on a medium, e.g., a computer readable medium, to control at least one processing element to implement any above described embodiment. The medium may correspond to any medium/media permitting the storing and/or transmission of the computer readable code.

The computer readable code may be recorded/transferred on a medium in a variety of ways, with examples of the medium including magnetic storage media (e.g., ROM, floppy disks, hard disks, etc.), optical recording media (e.g., CD-ROMs, or DVDs) The media may also be a distributed network, so that the computer readable code is stored/transferred and executed in a distributed fashion. Still further, as only an example, the processing element may include a processor or a computer processor, and processing elements may be distributed and/or included in a single device.

The term 'module', as used herein, may mean, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

As described above, one or more embodiments of the apparatus, method and medium outputting a wide gamut image according to the present invention may experimentally determine one or more parameters that are needed to convert an existing color space into a wide gamut, and apply the experimentally determined parameters to an input image, thereby outputting the input image using colors as natural as possible.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus outputting a wide gamut image, the apparatus comprising:
a feature extraction module to extract one or more feature differences between a standard gamut and a wide gamut of an image, the extracted feature differences being feature differences which result in a discrepancy larger than a predetermined threshold;
a color range setting module to set a hue range according to the extracted feature differences and one or more experimentally determined parameters; and
a conversion module to convert the image, from the wide gamut to the standard gamut, according to the extracted feature differences, the experimentally determined parameters, and the set hue range,
wherein the experimentally determined parameters are determined by an experiment
conducted by inputting a wide gamut image, generated by a wide gamut imaging device, to a monitor and the wide gamut image output by the monitor is viewed by a plurality of viewers,
wherein predetermined parameters are applied to the wide gamut image and the results of the application are printed, the predetermined parameters being based on the feature differences which result in the discrepancy larger than the predetermined threshold,
wherein the plurality of viewers choose one or more printed images that are similar to the wide gamut image output by the monitor from among the printed images and one or more parameters corresponding to the chosen one or more images is determined to be the experimentally determined parameters based on the one or more images chosen by the plurality of viewers.

2. The apparatus of claim 1, wherein the standard gamut comprises a standard RGB (sRGB) gamut.

3. The apparatus of claim 1, wherein the wide gamut comprises an Adobe wide gamut.

4. The apparatus of claim 1, wherein the feature extraction module extracts one or more primary colors that result in larger discrepancies between the standard gamut and the wide gamut than the predefined threshold.

5. The apparatus of claim 1, wherein the conversion module comprises:
a lightness converter to convert lightness of the image;
a hue converter to perform linear hue conversion so that hues in an image obtained by the conversion performed by the lightness converter can be within the hue range; and
a chroma converter to perform chroma conversion by applying the experimentally determined parameters to chroma of a primary color that result in a larger chroma discrepancy between the standard gamut and the wide gamut than a predefined threshold.

6. The apparatus of claim 5, wherein the lightness converter converts the lightness of the image using a sigmoidal function.

7. The apparatus of claim 5, wherein the hue converter performs the hue conversion using a plurality of weights in a two-dimensional (2D) lookup table regarding a predetermined range of hues.

8. The apparatus of claim 5, further comprising an image output module to output the converted image.

9. The apparatus of claim 8, wherein the hue converter performs the hue conversion using:

$$hue_{Temp} = \frac{(hue_{IN} - wRGB\_hue_L) \times output\_hue_H - (hue_{IN} - wRGB\_hue_H) \times output\_hue_L}{wRGB\_hue_H - wRGB\_hue_L}; \text{ and}$$

$$hue_{OUT} = hue_{IN} + (hue_{Temp} - hue_{IN}) \times \frac{w_{c,\beta}}{w_{\max c,\beta}}$$

where $hue_{IN}$ indicates a hue angle of the image when the image is analyzed using a CIE L*a*b* color space, $hue_{Temp}$ indicates a hue angle obtained by linear hue conversion, $hue_{OUT}$ indicates a hue angle obtained by applying a weight in a 2D lookup table, $wRGB\_hue_L$ indicates a lower boundary of a wide gamut including the hue angle $hue_{IN}$, $output\_hue_L$ indicates a lower boundary of a gamut that includes the hue angle $hue_{IN}$ and is supported by the image output module, $output\_hue_H$ indicates an upper boundary of the gamut that includes the hue angle $hue_{IN}$ and is supported by the image output module, $w_{o,\theta}$ indicates a first weight corresponding to a chroma c and a hue angle θ, and $w_{max\ o,\theta}$ indicates a second weight corresponding to a maximum chroma max c and the hue angle θ.

10. An apparatus outputting a wide gamut image, the apparatus comprising:
a feature extraction module to extract one or more feature differences between a standard gamut and a wide gamut of an image;
a color range setting module to set a hue range according to the extracted feature differences and one or more experimentally determined parameters; and
a conversion module to convert the image, from the wide gamut to the standard gamut, according to the extracted feature differences, the experimentally determined parameters, and the hue range, wherein the experimentally determined parameters comprise at least one of:
hue angle variations that are needed to map, to the wide gamut, hue of a primary color that results in a larger hue discrepancy between the standard gamut and the wide gamut than a first predefined threshold; and
chroma variations that are needed to map, to the wide gamut, chroma of a primary color that results in a larger chroma discrepancy between the standard gamut and the wide gamut than a second predefined threshold.

11. A method of outputting a wide gamut image implemented by an apparatus outputting a wide gamut image, the method comprising:
extracting, by way of the apparatus, one or more feature differences between a standard gamut and a wide gamut of an image, the extracted feature differences being feature differences which result in a discrepancy larger than a predetermined threshold;
setting a hue range according to the extracted feature differences and one or more experimentally determined parameters; and
converting the image, from the wide gamut to the standard gamut, according to the extracted feature differences, the experimentally determined parameters, and the hue range,
wherein the experimentally determined parameters are determined by an experiment
conducted by inputting a wide gamut image, generated by a wide gamut imaging device, to a monitor and the wide gamut image output by the monitor is viewed by a plurality of viewers,
wherein predetermined parameters are applied to the wide gamut image and the results of the application are printed, the predetermined parameters being based on the feature differences which result in the discrepancy larger than the predetermined threshold,
wherein the plurality of viewers choose one or more printed images that are similar to the wide gamut image output by the monitor, from among the printed images, and one or more parameters corresponding to the chosen one or more images is determined to be the experimentally determined parameters based on the one or more images chosen by the plurality of viewers.

12. The method of claim 11, wherein the standard gamut comprises a standard RGB (sRGB) gamut.

13. The method of claim 11, wherein the wide gamut comprises an Adobe wide gamut.

14. The method of claim 11, wherein the extracting comprises extracting one or more primary colors that result in larger discrepancies between the standard gamut and the wide gamut than a predefined threshold.

15. The method of claim 14, wherein the experimentally determined parameters comprise at least one of:
hue angle variations that are needed to map, to the wide gamut, hue of a primary color that results in a larger hue discrepancy between the standard gamut and the wide gamut than a first predefined threshold; and
chroma variations that are needed to map, to the wide gamut, chroma of a primary color that results in a larger chroma discrepancy between the standard gamut and the wide gamut than a second predefined threshold.

16. The method of claim 11, wherein the converting comprises:
converting lightness of the image;
performing linear hue conversion so that hues in an image obtained by the converting of the lightness can be within the hue range; and
performing chroma conversion by applying the experimentally determined parameters to chroma of a primary color that result in a larger chroma discrepancy between the standard gamut and the wide gamut than a predefined threshold.

17. The method of claim 16, wherein the converting of the lightness comprises converting the lightness of the image using a sigmoidal function.

18. The method of claim 16, wherein the performing of the linear hue conversion comprises performing the hue conversion using a plurality of weights in a 2D lookup table regarding a predetermined range of hues.

19. The method of claim 16, wherein the performing of the linear hue conversion comprises performing the hue conversion using:

$$hue_{Temp} = \frac{(hue_{IN} - wRGB\_hue_L) \times output\_hue_H - (hue_{IN} - wRGB\_hue_H) \times output\_hue_L}{wRGB\_hue_H - wRGB\_hue_L};$$

$$hue_{OUT} = hue_{IN} + (hue_{Temp} - hue_{IN}) \times \frac{w_{c,\beta}}{w_{maxc,\beta}}$$

where $hue_{IN}$ indicates a hue angle of the image when the image is analyzed using a CIE L*a*b* color space, $hue_{Temp}$ indicates a hue angle obtained by linear hue conversion, $hue_{OUT}$ indicates a hue angle obtained by applying a weight in a 2D lookup table, $wRGB\_hue_L$ indicates a lower boundary of a wide gamut including $hue_{IN}$, $output\_hue_L$ indicates a lower boundary of a gamut that includes $hue_{IN}$ and is supported by any apparatus used to output a converted image, $output\_hue_H$ indicates an upper boundary of the gamut that includes $hue_{IN}$ and is supported any apparatus used to output a converted image, $w_{o,\theta}$ indicates a first weight corresponding to a chroma c and a hue angle $\theta$, and $w_{max\ o,\theta}$ indicates a second weight corresponding to a maximum chroma max c and the hue angle $\theta$.

20. At least one non-transitory medium comprising computer readable code to control at least one processing element to implement the method of claim 11.

21. The method of claim 11, further comprising outputting the converted image.

22. A method of outputting a wide gamut image implemented by an apparatus outputting a wide gamut image, the method comprising:
setting a hue range, by way of the apparatus, based on one or more extracted feature differences between a standard gamut and a wide gamut of an image and one or more experimentally determined parameters, the extracted feature differences being feature differences which result in a discrepancy larger than a predetermined threshold; and
converting the image, from the wide gamut to the standard gamut, based on the extracted feature differences, the experimentally determined parameters and the set hue range,
wherein the experimentally determined parameters are determined by an experiment
conducted by inputting a side gamut image, generated by a wide gamut imaging device, to a monitor and the wide gamut image output by the monitor is viewed by a plurality of viewers,
wherein predetermined parameters are applied to the wide gamut image and the results of the application are printed, the predetermined parameters being based on the feature differences which result in the discrepancy larger than the predetermined threshold,
wherein the plurality of viewers choose one or more images that are similar to the wide gamut image output by the monitor from among the printed images and one or more parameters corresponding to the chosen one or more images is determined to be the experimentally determined parameters based on the one or more images chosen by the plurality of viewers.

23. The method of claim 22, further comprising extracting one or more primary colors that result in larger discrepancies between the standard gamut and the wide gamut than a predefined threshold.

24. The method of claim 22, wherein the experimentally determined parameters comprise at least one of:
hue angle variations that are needed to map, to the wide gamut, hue of a primary color that results in a larger hue discrepancy between the standard gamut and the wide gamut than a first predefined threshold; and
chroma variations that are needed to map, to the wide gamut, chroma of a primary color that results in a larger chroma discrepancy between the standard gamut and the wide gamut than a second predefined threshold.

25. The method of claim 22, wherein the converting of the image comprises:
converting lightness of the image;
performing linear hue conversion so that hues in a second image obtained by the converting of the lightness can be within the hue range; and
performing chroma conversion by applying the experimentally determined parameters to chroma of a primary color that result in a larger chroma discrepancy between the standard gamut and the wide gamut than a predefined threshold.

26. The method of claim 25, wherein the performing of the linear hue conversion comprises performing the hue conversion using a plurality of weights in a 2D lookup table regarding a predetermined range of hues.

27. At least one non-transitory medium comprising computer readable code to control at least one processing element to implement the method of claim 22.

* * * * *